United States Patent
Ozaki et al.

(10) Patent No.: US 8,072,531 B2
(45) Date of Patent: Dec. 6, 2011

(54) IMAGING DEVICE (75) Inventors: Masayuki Ozaki, Osaka (JP); Yuichi Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 518 days.

(21) Appl. No.: 12/438,254

(22) PCT Filed: Aug. 21, 2007

(86) PCT No.: PCT/JP2007/066207
§ 371 (c)(1),
(2), (4) Date: Feb. 20, 2009

(87) PCT Pub. No.: WO2008/023709
PCT Pub. Date: Feb. 28, 2008

(65) Prior Publication Data
US 2010/0177214 A1    Jul. 15, 2010

(30) Foreign Application Priority Data
Aug. 22, 2006  (JP) ................................ 2006-224866

(51) Int. Cl.
*G03B 13/36*   (2006.01)
*H04N 5/222*   (2006.01)

(52) U.S. Cl. .................................. 348/349; 348/333.01

(58) Field of Classification Search .................. 348/349, 348/333.01
See application file for complete search history.

(56) References Cited

U.S. PATENT DOCUMENTS

| | | | |
|---|---|---|---|
| 2003/0107664 A1 | 6/2003 | Suzuki | |
| 2003/0193600 A1 | 10/2003 | Kitamura et al. | |
| 2005/0012827 A1* | 1/2005 | Nakasuji et al. | 348/222.1 |
| 2005/0062872 A1 | 3/2005 | Nakashima et al. | |
| 2009/0021607 A1* | 1/2009 | Takenaka et al. | 348/231.99 |
| 2009/0219428 A1* | 9/2009 | Nakano et al. | 348/308 |
| 2010/0007784 A1* | 1/2010 | Haneda | 348/347 |
| 2010/0039554 A1* | 2/2010 | Mizuno et al. | 348/390.1 |

FOREIGN PATENT DOCUMENTS

| | | |
|---|---|---|
| JP | 2002-165141 | 6/2002 |
| JP | 2002-300457 | 10/2002 |
| JP | 2003-262788 | 9/2003 |
| JP | 2003-348437 | 12/2003 |
| JP | 2005-092081 | 4/2005 |

* cited by examiner

*Primary Examiner* — W. B. Perkey
(74) *Attorney, Agent, or Firm* — Hamre, Schumann, Mueller & Larson, P.C.

(57) ABSTRACT

An imaging device of the present invention includes a normal operation period and a focusing operation period; a CCD (102) able to mix image signals of a plurality of pixels and read the mixed image signals; an AFE (103) that converts the image signals to image data; a signal processing unit (104*b*) that converts the image data to display data; an LCD (107) that displays the display data; and a pixel mixing control unit (104*c*) that changes a read frame rate and pixel mixing number of the CCD (102). The pixel mixing control unit (104*c*) performs control so that in the focusing operation period, the image signals are read from the CCD (102) at a higher read frame rate than in the normal operation period, and performs control so that in the focusing operation period, the image signals are read from the CCD (102) at a larger pixel mixing number than in the normal operation period. This structure enables providing an imaging device in which a high-speed focusing operation can be performed even if an imaging subject is dark.

14 Claims, 6 Drawing Sheets

IMAGING DEVICE

TECHNICAL FIELD

The present invention relates to a focusing operation of an imaging device. More specifically, the present invention relates to technology that enables a high-speed focusing operation even if an imaging subject is dark.

BACKGROUND ART

In recent years, the prevalence of digital cameras has been significant. With a compact digital camera for beginners to photography, it is desirable to be able to take photos of roughly a certain quality regardless of the user's skill. Therefore, focusing is normally performed automatically, and there is a need to shorten the focusing operation period as much as possible so that a photo opportunity is not missed.

Many compact digital cameras do not have an optical viewfinder, and in the focusing operation period as well, an imaging subject continues to be viewed on a liquid crystal display unit arranged on the back face of the digital camera body. Therefore, in the focusing operation period as well, it is necessary to display an image of the imaging subject on the display unit without causing a sense of unpleasantness.

There are mainly two automatic focusing operation methods, namely an active method and a passive method. An active method is a method in which the distance to an imaging subject is measured by irradiating an imaging subject with infrared radiation or ultrasonic waves and receiving infrared radiation or ultrasonic waves that have reflected off of the imaging subject. Active methods often are employed in compact silver salt cameras.

On the other hand, a passive method is a method in which the distance to an imaging subject is measured based on images captured by an optical system. Passive methods further can be divided into phase difference detection methods and contrast detection methods. A phase difference detection method often is employed in single lens reflexive cameras, regardless of whether the camera is a silver salt camera or digital camera. On the other hand, a contrast detection method often is employed in compact digital cameras.

In a contrast detection method, images are obtained from an imaging element while gradually moving a focus lens in an optical system in the optical axis direction, and the focal position is set to the position of the focus lens where the contrast of the obtained image is maximal. Contrast generally is evaluated based on a high frequency component in an image obtained from an imaging element.

Since the evaluation of the high frequency component is performed on a frame-by-frame basis, shortening the focusing operation period requires raising the read frame rate of the imaging element. However, if the read frame rate of the imaging element is raised, the exposure time becomes shorter. If the exposure time in the imaging element becomes shorter, the image displayed on the display unit becomes darker, and also an automatic focusing operation by the contrast detection method becomes unstable, which is a problem.

A digital camera has been proposed in relation to the above problem (see Patent Document 1). In the digital camera according to Patent Document 1, the read frame rate of an imaging element is increased if the luminance of an imaging subject is greater than or equal to a first threshold, and the read frame rate of the imaging element is decreased if the luminance of the imaging subject is less than or equal to a second threshold.

According to this structure, a high-speed focusing operation is performed with use of a high read frame rate when the imaging subject is bright, and the exposure time is lengthened with use of a low read frame rate when the imaging subject is dark.

Patent Document 1: JP 2003-262788A

DISCLOSURE OF INVENTION

Problem to be Solved by the Invention

However, in the digital camera disclosed in Patent Document 1, a high-speed focusing operation cannot be performed when the imaging subject is dark.

An object of the present invention is to provide an imaging device that can perform a high-speed focusing operation even if an imaging subject is dark.

Means for Solving Problem

An imaging device of the present invention includes a normal operation period and a focusing operation period and includes: an imaging element able to mix image signals of a plurality of pixels and read the mixed image signals; a first signal processing unit that converts the image signals into image data; a second signal processing unit that converts the image data into display data; a display unit that displays an image based on the display data; a read frame rate control unit that changes a read frame rate of the imaging element; and a pixel mixing control unit that changes a pixel mixing number of the imaging element. The read frame rate control unit performs control so that in the focusing operation period, the image signals are read from the imaging element at a higher read frame rate than in the normal operation period, and the pixel mixing control unit performs control so that in the focusing operation period, the image signals are read from the imaging element using a larger pixel mixing number than in the normal operation period.

Effects of the Invention

According to the present invention, the pixel mixing number in the focusing operation period is changed according to the brightness of the imaging subject, and therefore increasing the pixel mixing number when the imaging subject is dark obtains the same effect as lengthening the exposure time. This enables performing a high speed focusing operation.

DESCRIPTION OF THE CHARACTERS 101 optical system
101a focus lens 101b optical axis
102 CCD
103 AFE
104 signal processing LSI
104a CPU
104b signal processing unit
104c pixel mixing control unit
104d focusing control unit
105 SDRAM
106 memory card
107 LCD
108 shutter button
109 bus
110 CCD driver IC
111 motor driver IC
112 exposure meter

DESCRIPTION OF THE INVENTION

An imaging device of the present invention can have various forms such as the following, based on the above-described structure.

In other words, in an imaging device of the present invention, the pixel mixing control unit may change a pixel mixing number of a frame that is immediately before the focusing operation period. According to this structure, the pixel mixing number is raised when the imaging subject is dark, thereby obtaining the same effect as lengthening the exposure time.

Also, the pixel mixing control unit may change a pixel mixing number of a predetermined number of frames that follow the focusing operation period.

Also, the read frame rate control unit may perform control so that in a frame that is immediately before the focusing operation period, the image signals are read from the imaging element at a read frame rate that is higher than a read frame rate of the normal operation period and lower than a read frame rate of the focusing operation period. This structure enables continuous display of images of the imaging subject smoothly.

Also, the display unit may display the image based on the display data at a display frame rate that is the same as a read frame rate of the imaging element. This structure enables continuous display of images of the imaging subject smoothly.

Also, in the focusing operation period, the display unit may display the image based on the display data at a display frame rate that is the same as a read frame rate of the imaging element in the normal operation period. This structure eliminates a change in the display frame rate even in the focusing operation period, thereby enabling avoiding a sense of unpleasantness due to a change in the display frame rate.

Also, the above imaging device further may include: a luminance detection unit that detects a brightness of an imaging subject, wherein the pixel mixing control unit may change a pixel mixing number of the focusing operation period according to the brightness of the imaging subject detected by the luminance detection unit. According to this structure, the pixel mixing number is raised if the imaging subject is dark, thereby enabling the image to be brighter.

Also, the pixel mixing control unit may change a pixel mixing number of a frame that is immediately before the focusing operation period according to the brightness of the imaging subject detected by the luminance detection unit. According to this structure, an intermediate pixel mixing number that is between the pixel mixing number in the normal operation period and the pixel mixing number in the focusing operation period is set, thereby eliminating a drastic change in image brightness, and enabling continuously displaying images smoothly.

Also, the pixel mixing control unit continuously may change a pixel mixing number of the focusing operation period according to the brightness of the imaging subject detected by the luminance detection unit. This structure enables reducing a change in image brightness in the focusing operation period, and continuously displaying images smoothly.

Also, the read frame rate control unit may change the read frame rate of the focusing operation period according to the brightness of the imaging subject detected by the luminance detection unit. According to this structure, the read frame rate is lowered to ensure a longer exposure time if the imaging subject is dark, and the read frame rate is raised if the imaging subject is bright, thereby enabling further shortening the focusing operation period.

Also, the read frame rate control unit may change a read frame rate of a frame that is immediately before the focusing operation period according to the brightness of the imaging subject detected by the luminance detection unit. According to this structure, the read frame rate of the frame immediately before the focusing operation period is lowered if the imaging subject is dark. This enables taking a longer exposure time. On the other hand, if the imaging subject is bright, the exposure time can be shorter, and therefore the read frame rate of the frame immediately before the focusing operation period is raised. This enables further shortening the focusing operation period.

Also, if the brightness of the imaging subject detected by the luminance detection unit is darker than a predetermined brightness, the read frame rate control unit may perform control so that the image signals are read from the imaging element after a plurality of frame periods in the focusing operation period have elapsed. This structure enables obtaining the same effect as lowering the read frame rate.

Also, the pixel mixing control unit may change a pixel mixing number of the focusing operation period according to a brightness of an image based on an image signal output from the imaging element. According to this structure, the pixel mixing number is raised if the imaging subject is dark, thereby causing the image to be brighter.

Also, the pixel mixing control unit may change a pixel mixing number of a frame that is immediately before the focusing operation period according to the brightness of the image based on the image signal output from the imaging element. According to this structure, an intermediate pixel mixing number that is between the pixel mixing number in the normal operation period and the pixel mixing number in the focusing operation period is set, thereby eliminating a drastic change in image brightness, and enabling continuous display of images smoothly.

Also, the pixel mixing control unit continuously may change the pixel mixing number of the focusing operation period according to the brightness of the image based on the image signal output from the imaging element. This structure enables reducing a change in image brightness in the focusing operation period, and continuously displaying images smoothly.

Also, the read frame rate control unit may change a read frame rate of the focusing operation period according to the brightness of the image based on the image signal output from the imaging element. According to this structure, the read frame rate is lowered to ensure a longer exposure time if the imaging subject is dark, and the read frame rate is raised if the imaging subject is bright, thereby enabling further shortening of the focusing operation period.

Also, the read frame rate control unit may change a read frame rate of a frame that is immediately before the focusing operation period according to the brightness of the image based on the image signal output from the imaging element. According to this structure, the read frame rate of the frame immediately before the focusing operation period is lowered if the imaging subject is dark. This enables taking a longer exposure time. On the other hand, if the imaging subject is bright, the exposure time can be shorter, and therefore the read frame rate of the frame immediately before the focusing operation period is raised. This enables further shortening the focusing operation period.

Also, if the brightness of the image based on the image signal output from the imaging element is darker than a predetermined brightness, the read frame rate control unit may perform control so that the image signals are read from the imaging element after a plurality of frame periods in the focusing operation period have elapsed. This structure enables obtaining the same effect as lowering the read frame rate.

Embodiment 1

1. Imaging Device Structure

Figure 1:
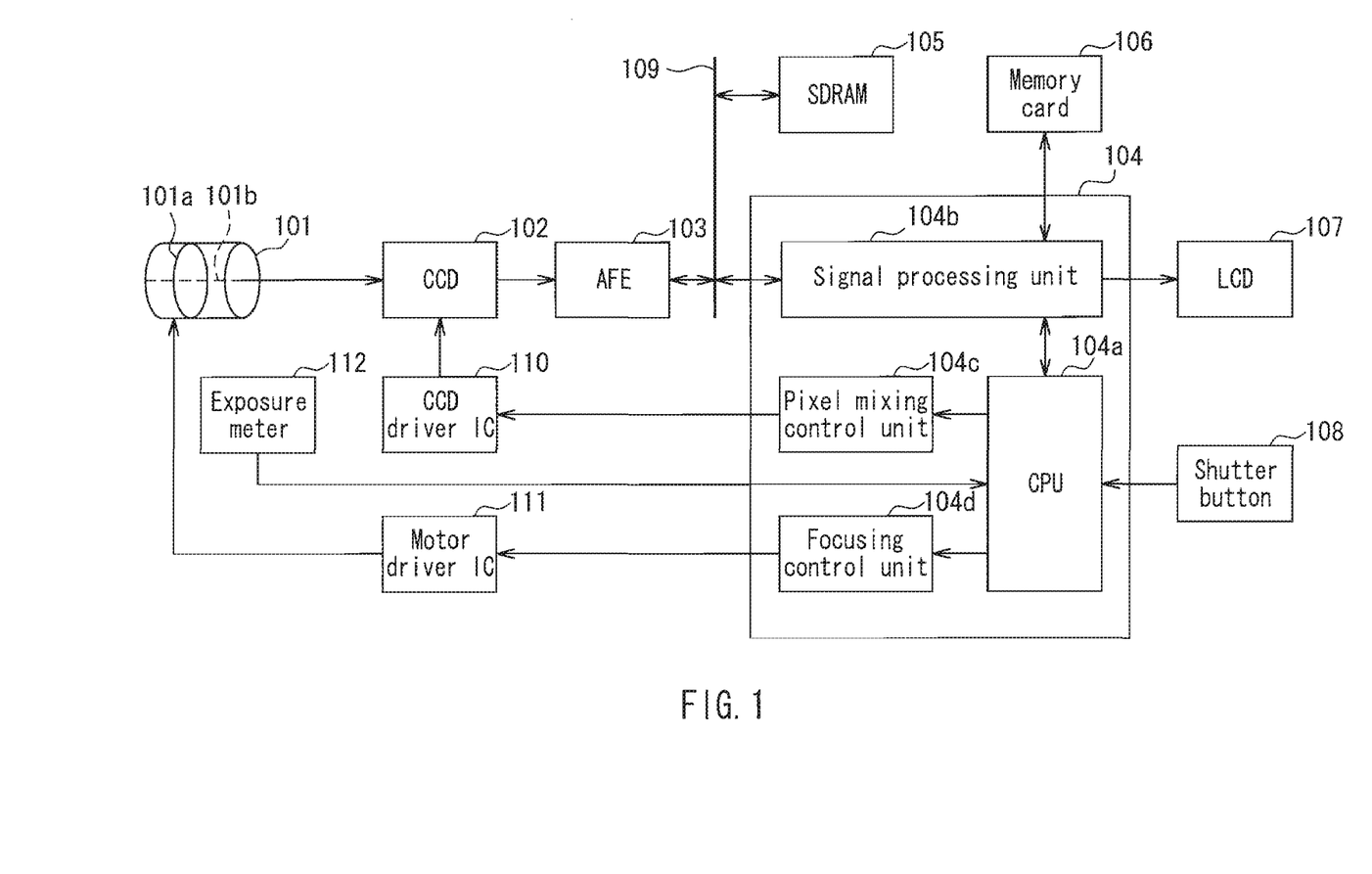
FIG. 1 is a block diagram of a digital camera that is Embodiment 1.

FIG. 1 is a block diagram of a digital camera in the embodiment.

An optical system 101 forms an image of an imaging subject on a CCD 102 (CCD: Charge Coupled Device). The optical system 101 comprises a plurality of lens groups (not shown) and includes a focus lens 101a. The image of the imaging subject is focused on the CCD 102 by the movement of the focus lens 101a inside a barrel, which is holding the lens groups, in the direction of an optical axis 101b.

The CCD 102 converts the formed optical image of the imaging subject into an electrical signal (image signal), and outputs the electrical signal. An AFE (Analog Front End) 103 converts the image signal output from the CCD 102, which is an analog signal, into image data that is a digital signal, and stores the image data in an SDRAM 105 (Syncronous Dynamic Random Access Memory) via a bus 109. The AFE 103 is an LSI that includes a CDS (Correlated Double Sampling) circuit that eliminates a noise component of an image signal, an AGC (Automatic Gain Control) amplifier that adjusts the level of an image signal, and an A/D converter that converts an analog signal into a digital signal (none of which are shown).

A signal processing LSI 104 comprises a CPU (Central Processing Unit) 104a, a signal processing unit 104b, a pixel mixing control unit 104c, and a focusing control unit 104d. The CPU 104a controls an entirety of the signal processing LSI 104 in accordance with an instruction recorded on a ROM (Read Only Memory, not shown) in the signal processing LSI 104. The signal processing unit 104b converts image data stored in the SDRAM 105 by the AFE 103 into display data suited for display on an LCD (Liquid Crystal Display) 107, and outputs the display data to the LCD 107.

The signal processing LSI 104 causes a focusing operation period to start, in accordance with a shutter button 108 being pressed halfway in a condition in which display data is being output to the LCD 107. Also, the signal processing LSI 104 controls units so as to perform imaging, in accordance with the shutter button 108 being fully pressed. If image data stored in the SDRAM 105 is image data captured in accordance with the shutter button 108 being fully pressed, the signal processing unit 104b performs control so as to cause the image data stored in the SDRAM 105 to be converted into record data and recorded to a memory card 106. Also, the signal processing unit 104b converts record data recorded to the memory card 106 into image data for displaying (hereinafter, called display data), and causes an image to be displayed on the LCD 107 based on the display data.

When the focusing operation period starts in accordance with the shutter button 108 being pressed halfway, the signal processing unit 104b obtains an intensity of a high frequency component of image data stored in the SDRAM 105. The high frequency component of the image data is obtained by transforming the image data into spatial frequency data by Fourier transformation, discrete cosine transformation, wavelet transformation, or the like.

The focusing control unit 104d sends a drive signal to a motor driver IC 111 based on information pertaining to the high frequency component that was sent from the signal processing unit 104b, to cause the focus lens 101a to move a small distance to a telephoto side or a wide-angle side. After the focus lens 101a has moved a small distance, the signal processing unit 104b again obtains the intensity of a high frequency component of image data stored in the SDRAM 105. The focusing control unit 104d repeats the above operation and causes the focus lens 101a to move to a focal position where the intensity of the high frequency component is maximal.

The CCD 102 can mix the image signals of a plurality of pixels and read the mixed image signals. Also, the CCD 102 has a function of selecting, with respect to a predetermined pixel, a mixing number n (n being an integer greater than or equal to 1) indicating the number of pixels in a periphery of the predetermined pixels that are to be mixed. When the CCD 102 mixes a plurality of image signals and then reads the mixed image signals, the level of the image signals of the pixels increases commensurately to the number of pixels that were mixed, thereby obtaining the same effect as lengthening the exposure time.

The pixel mixing control unit 104c has a function of changing the pixel mixing number of the CCD 102. The pixel mixing control unit 104c also has a function of changing the read frame rate of the CCD 102. The pixel mixing control unit 104c calculates a pixel mixing number based on information pertaining to the brightness of the imaging subject that was sent from an exposure meter 112 via the CPU 104a, and sends a drive signal to a CCD driver IC 110 to instruct a change in the number of pixels to be mixed in the CCD 102.

The exposure meter 112 detects the brightness of the imaging subject and notifies information pertaining to the brightness to the CPU 104a.

Note that the CCD 102 is an example of an imaging element of the present invention. The AFE 103 is an example of a first signal processing unit of the present invention. The signal processing unit 104b is an example of a second signal processing unit of the present invention. The LCD 107 is an example of a display unit of the present invention. The pixel mixing control unit 104c includes the functionality of a read frame rate control unit and a pixel mixing control unit of the present invention. The exposure meter 112 is an example of a luminance detection unit of the present invention.

Also, the AFE 103 corresponding to the first signal processing unit of the present invention and the signal processing LSI 104 including the signal processing unit 104b that corresponds to the second signal processing unit of the present invention may be constituted from a signal LSI. The pixel mixing control unit 104c may be included in the signal processing unit 104b. The CPU 104a may be structured so as to be able to execute the functionality of the pixel mixing control unit 104c.

2. Imaging Device Operations

[2-1. Focusing Operation]

Figure 2:
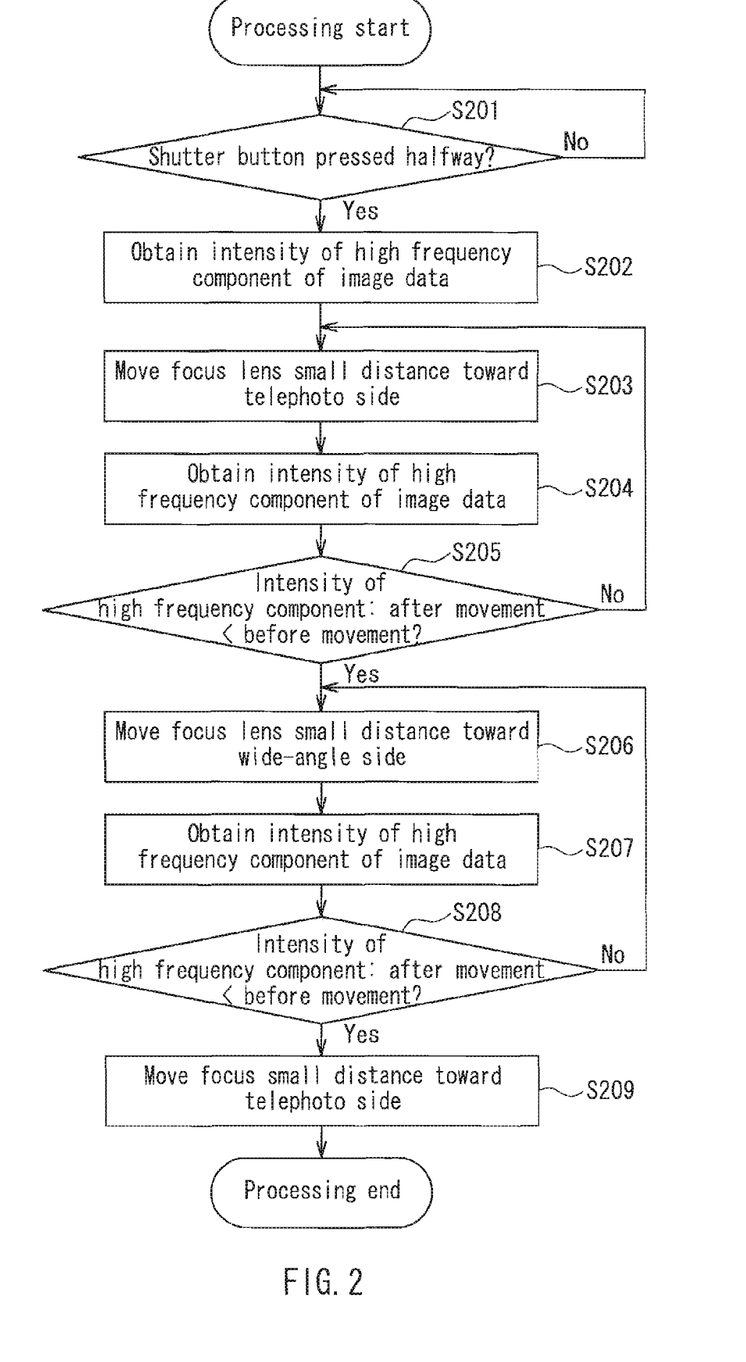
FIG. 2 is a flowchart showing an example of focusing operation processing.

FIG. 2 is a flowchart showing an example of focusing operation processing. In accordance with the shutter button 108 being pressed halfway, the focusing operation is started (S201: YES judgment). The CCD 102 periodically outputs image signals in the focusing operation period as well. The AFE 103 updates and stores the SDRAM 105 with the image signals output from the CCD 102.

Next, the signal processing unit 104b obtains the intensity of the high frequency component of the image data currently output from the AFE 103 (S202).

Next, the focusing control unit 104d controls the motor driver IC 111 based on the intensity of the high frequency component obtained by the signal processing unit 104b, to cause the focus lens 101a to move a small distance toward the telephoto side (S203).

Next, the signal processing unit 104b again obtains the intensity of the high frequency component of image data output from the AFE 103 (S204).

Next, the signal processing unit 104b repeats the processing of steps S203 and S204 if the intensity of the high frequency component obtained after moving the focus lens 101a is higher than the intensity of the high frequency component obtained before moving the focus lens 101a (S205: NO judgment).

On the other hand, the signal processing unit 104b outputs a lens move instruction to the focusing control unit 104d if the intensity of the high frequency component obtained after moving the focus lens 101a is lower than the intensity of the high frequency component obtained before moving the focus lens 101a (S205: YES judgment). Based on the instruction from the signal processing unit 104b, the focusing control unit 104d controls the motor driver IC 111 to cause the focus lens 101a to move a small distance toward the wide-angle side (S206).

Next, the signal processing unit 104b again obtains the intensity of the high frequency component of image data output from the AFE 103 (S207).

Next, the signal processing unit 104b repeats the processing of steps S206 and S207 if the intensity of the high frequency component obtained after moving the focus lens 101a is higher than the intensity obtained before the movement (S208: NO judgment).

If the intensity of the high frequency component obtained after moving the focus lens 101a is lower than the intensity of the high frequency component obtained before moving the focus lens 101a (S208: YES judgment), the signal processing unit 104b causes the focus lens 101a to move a small distance toward the telephoto side one time (S209), and ends processing.

Performing control such as described above obtains a focal position of the focus lens 101a where the intensity of the high frequency component of the image data is maximal.

[2-2. Pixel Mixing Operation]

Figure 3:
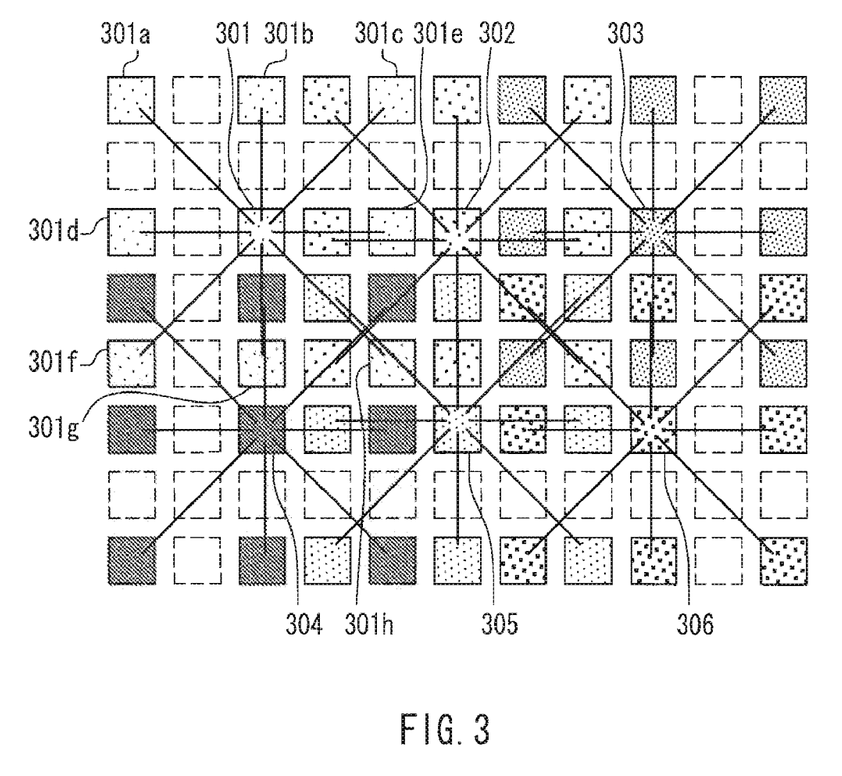
FIG. 3 is a pattern diagram showing an example of combinations of pixels in a case of mixing and reading image signals.

FIG. 3 is a pattern diagram showing an example of combinations of pixels in a case of mixing and reading image signals. In this exemplary case, pixels 301 to 306 are set as centers, and the image signals of these pixels are read after mixing in the image signals of eight peripheral pixels that are two pixels away from the center pixel in the up, down, left, right, and diagonal directions. Specifically, in the case of setting the pixel 301 in FIG. 3 as the center pixel, the image signals of pixels 301a to 301h that are two pixels away are mixed with the image signal of the pixel 301, and thereafter the image signal of the pixel 301 is read. The same follows for the pixels 302 to 306.

When a plurality of image signals are mixed and then read, the level of the image signals of the pixels increases commensurately to the number of pixels that were mixed, thereby obtaining the same effect as lengthening the exposure time. Note that although FIG. 3 shows an example in which the image signals of eight peripheral pixels are mixed and then read, the mixing number n (n being an integer greater than or equal to 1) indicating the number of image signals to be mixed can be changed.

3. Transition in Imaging Device Operations

[3-1. Transition from Normal Operation to Focusing Operation]

Figure 4:
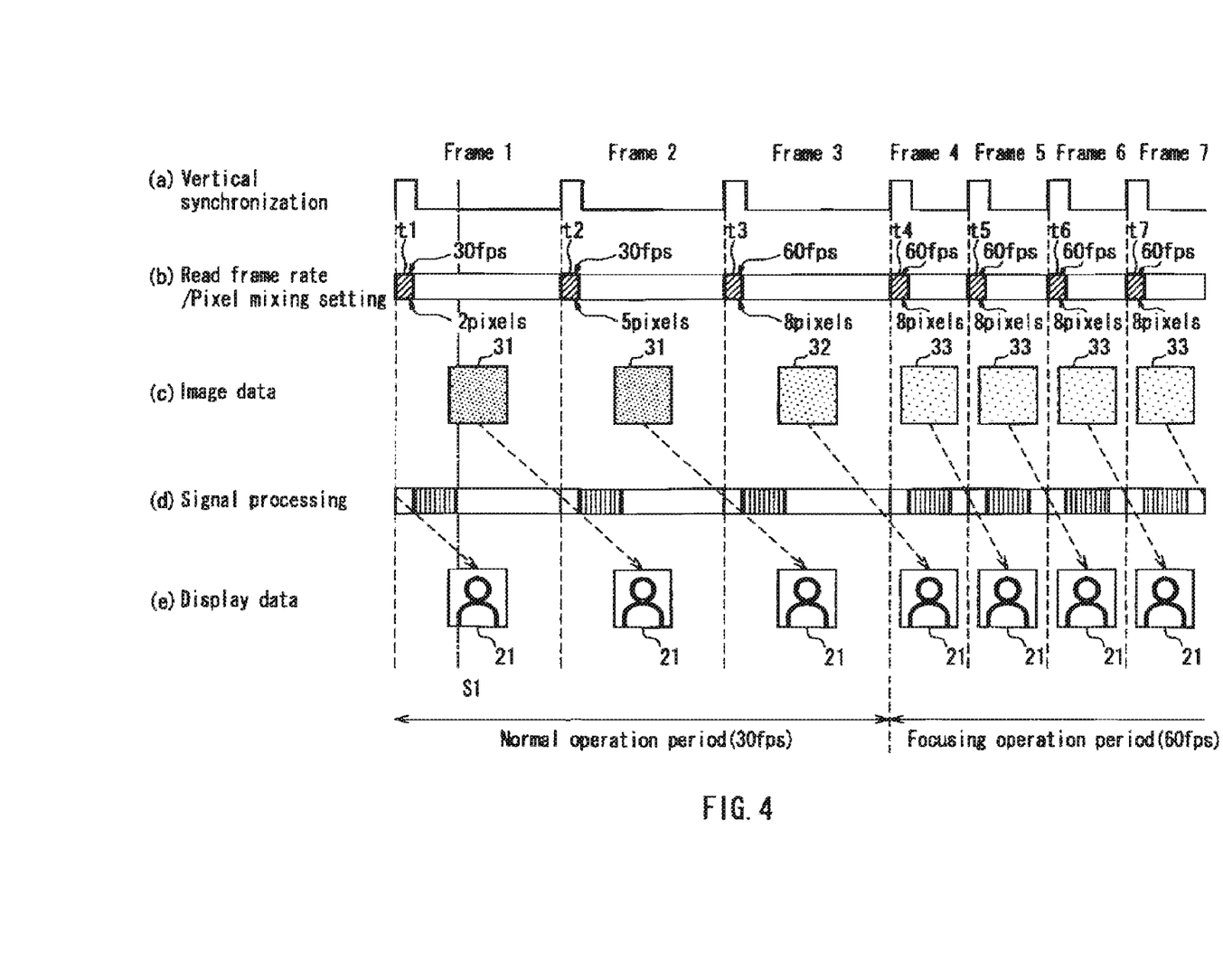
FIG. 4 is a timing chart showing a transition from a normal operation period to a focusing operation period.

FIG. 4 is a timing chart showing a transition from a normal operation period to the focusing operation period. FIG. 4(a) shows a vertical synchronization signal. In FIG. 4(b), t1 to t7 indicate periods in which read frame rate setting and pixel mixing setting are performed. Also, FIG. 4(b) shows the read frame rate and pixel mixing number set in the corresponding frames. FIG. 4(c) diagrammatically shows images based on image data output from the CCD 102 and stored in the SDRAM 105. Note that in the images shown in FIG. 4(c), the degree of pixel mixing is indicated by the density of dots, where the higher the pixel mixing number the lower the density of the dots. In FIG. 4(c), an image 31 is an image in which two pixels have been mixed, an image 32 is an image in which five pixels have been mixed, and an image 33 is an image in which eight pixels have been mixed. FIG. 4(d) shows timings of signal processing in which the signal processing unit 104b converts image data into display data. FIG. 4(e) diagrammatically shows display data. In FIG. 4(e), an image 21 is an image in an out-of-focus condition.

In the transition shown in FIG. 4, a timing S1 in the middle of frame 1 is a timing when the shutter button 108 is pressed halfway. The normal operation period is from frame 1 to frame 3, and the focusing operation period is from frame 4 to frame 7. In the normal operation period, the read frame rate of the CCD 102 is 30 fps (frame per second), and in the focusing operation period, the read frame rate is raised to 60 fps in order to perform high-speed focusing. The focusing operation period continues from frame 7 onward as well (not shown), until the focusing operation has been completed.

Read frame rate setting is performed in the periods t1 to t7 (vertical synchronization periods) shown in FIG. 4(b), and becomes enabled in the next frame. In frame 1 and frame 2, the read frame rate is set to 30 fps. In frame 3, the read frame rate is set to 60 fps in order for the read frame rate to be 60 fps from frame 4 onward. From frame 4 onward, the read frame rate continues to be set to 60 fps.

In frame 1 and frame 2, the image signals of two peripheral pixels are mixed and then read. In frame 3, which is the frame immediately before the focusing operation period, the image signals of five peripheral pixels are mixed and then read. In frame 4 to frame 7, which are in the focusing operation period, the image signals of eight peripheral pixels are mixed and then read.

In the focusing operation period, a sufficient exposure time cannot be ensured due the read frame rate being set to 60 fps. In particular, if the imaging subject is dark, the focusing operation becomes unstable since the S/N ratio of the image data output from the AFE 103 degrades. In view of this, the image signals of a plurality of pixels are mixed and then read. Also, even in frame 3, which is the frame immediately before the focusing operation period, the image signals of a plurality of pixels are mixed and then read.

Pixel mixing setting is performed in the periods t1 to t7 (vertical synchronization periods) shown in FIG. 4(b), and becomes enabled in the next frame. In frame 1, the mixing number is set to two pixels. In frame 2, the mixing number is set to five pixels. From frame 3 onward, the mixing number is set to eight pixels.

Also, in general, the number of pixels in the CCD 102 is from several million pixels to roughly 10 million pixels, and the number of pixels in the LCD 107 remains at several hundred thousand pixels. Therefore, in a case of displaying an image of the imaging subject on the LCD 107, YC separation processing and reduction processing are performed to generate display data, regardless of the normal operation period or focusing operation period.

As shown in FIG. 4(e), the display data generation processing is performed in the frame after image data has been stored in the SDRAM 105. In other words, the image data stored in the SDRAM 105 in frame 1 is converted into display data in frame 2. Conversion processing is performed in the same manner in frame 3.

In frame 3, image data (image 31) read after two-pixel mixing processing was performed in frame 2 is converted into display data. In frame 4, image data (image 32) read after performing five-pixel mixing processing in frame 3 is converted into display data. In frame 5, image data (image 33) read after performing eight-pixel mixing processing in frame 4 is converted into display data. In this way, inserting the five-pixel mixing processing frame in the transition from two-pixel mixing processing to eight-pixel mixing processing eliminates an extreme change in the number of pixels mixed and enables continuous display of images of the imaging subject more smoothly.

[3-2. Transition from Focusing Operation to Normal Operation]

Figure 5:
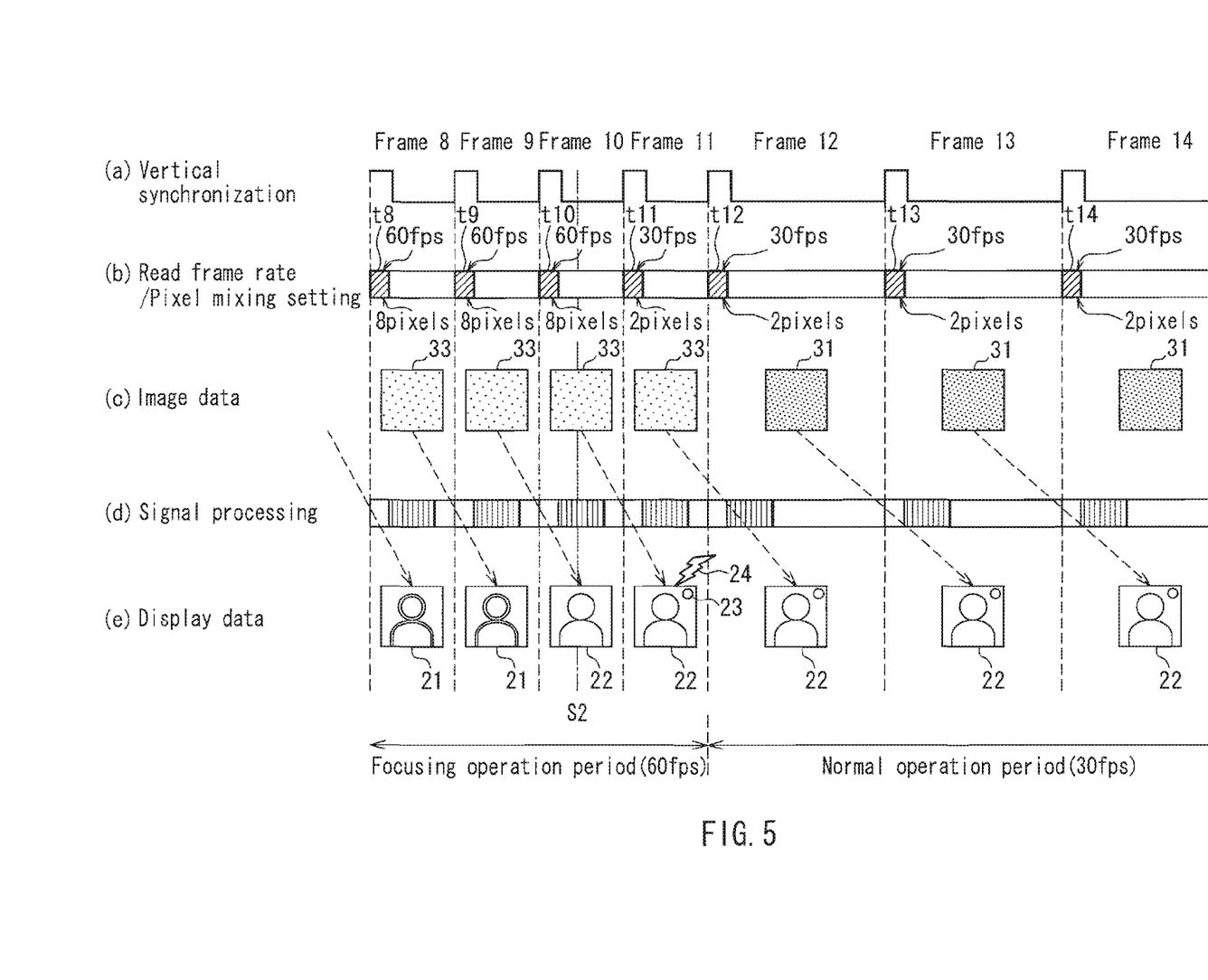
FIG. 5 is a timing chart showing a transition from the focusing operation period to the normal operation period.

FIG. 5 is a timing chart showing a transition from the focusing operation period to the normal operation period. The content of FIGS. 5(a) to (e) corresponds to the content of FIGS. 4(a) to (e) respectively. In FIG. 5, an image 22 indicates an image in an in-focus condition.

In FIG. 5, the focus is confirmed at a timing S2 in frame 10. When image focusing has been performed, a mark 23 is displayed on the image 22 as shown in FIG. 5(e) and a system sound 24 is output, thereby informing the user that the image has been focused. The mark 23 shown in FIG. 5(e) is displayed until the user releases the shutter button 108 from the halfway-pressed condition or until the user fully presses the shutter button 108 and imaging is performed.

The focusing operation period is from frame 8 to frame 11, and the normal operation period is from frame 12 to frame 14. The read frame rate of the CCD 102 is set to 60 fps in the focusing operation period, and lowered to 30 fps in the normal operation period.

Read frame rate setting is performed in the periods t8 to t14 (vertical synchronization periods) shown in FIG. 5(b), and the content of the setting becomes enabled in the next frame. From frame 8 to frame 10, the read frame rate is set to 60 fps. Since the focus is confirmed in frame 10, in frame 11 the read frame rate is set to 30 fps in order for the read frame rate to be 30 fps from frame 12 onward. From frame 12 onward, the read frame rate continues to be set to 30 fps.

Also, from frame 8 to frame 11, the image signals of eight peripheral pixels are mixed and then read. From frame 12 to frame 14, which are in the normal operation period, the image signals of two peripheral pixels are mixed and then read.

In the focusing operation period, a sufficient exposure time cannot be ensured due the read frame rate being set to 60 fps. In particular, if the imaging subject is dark, the focusing operation becomes unstable since the S/N ratio of the obtained image data degrades. In view of this, the image signals of a plurality of pixels are mixed and then read.

Pixel mixing setting is performed in the periods t8 to t14 (vertical synchronization periods) shown in FIG. 5(b), and becomes enabled in the next frame. From frame 8 to frame 10, the mixing number is set to eight pixels, and since the focus is confirmed in frame 10, the mixing number is set to two pixels in frame 11 in order for two-pixel mixing to be performed from frame 12 onward. The mixing number continues to be set to two pixels from frame 12 onward.

As shown in FIG. 5(e), the display data generation processing is performed in the frame after image data has been stored. For example, image data read after performing eight-pixel mixing in frame 11 is converted into display data in frame 12.

4. Effects of the Embodiment

As described above, in the present embodiment, the pixel mixing number when reading image signals of the CCD 102 in the focusing operation period is higher than the pixel mixing number in the normal operation period, thereby obtaining the same effect as lengthening the exposure time even in the focusing operation period in which the read frame rate is raised to 60 fps.

This has the superior effect of enabling the performing of a high-speed focusing operation even if an imaging subject is dark.

5. Other Structures

[5-1. Pixel Mixing]

In the present embodiment, the pixel mixing number of the frame immediately before the focusing operation period is set to an intermediate value between the pixel mixing number in the normal operation period and the pixel mixing number in the focusing operation period. Accordingly, in a case of transitioning from the normal operation period to the focusing operation period, there is no extreme change in the pixel mixing number and images of the imaging subject can be displayed continuously more smoothly.

Although eight pixel-mixing is transitioned directly to two-pixel mixing in the transition from the focusing operation period to the normal operation period in the present embodiment, the present invention is not limited to this. For example, control may be performed to set five-pixel mixing in a frame immediately after the focusing operation period. Also, control may be performed to change gradually the pixel mixing number from eight-pixel mixing to two-pixel mixing in a predetermined number of frames after the focusing operation period. Accordingly, in a case of transitioning from the focusing operation period to the normal operation period, there is no extreme change in the pixel mixing number and images of the imaging subject continuously can be displayed more smoothly.

[5-2. Read Frame Rate]

Although the read frame rate of the frame immediately before the focusing operation period is the same as the read frame rate in the normal operation period in the present embodiment, the read frame rate of the frame immediately before the focusing operation period may be set higher than the read frame rate in the normal operation period or lower than the read frame rate in the focusing operation period. Accordingly, in a case of transitioning from the normal operation period to the focusing operation period, there is no extreme change in the read frame rate and images of the imaging subject continuously can be displayed more smoothly.

[5-3. Luminance Detection]
[5-3-1. Pixel Mixing]

In the focusing operation, the focal position is set to the position of the focus lens 101a where the contrast of the image data is maximal. Therefore, a brighter imaging subject is advantageous to the focusing operation. In view of this, with use of information pertaining to the brightness of the imaging subject detected by the exposure meter 112, the pixel mixing number is raised if the imaging subject is dark, thereby obtaining the same effect as lengthening the exposure time. On the other hand, if the imaging subject is bright, the pixel mixing number may be lowered to display a finer image.

If the imaging subject is dark, the pixel mixing number of the frame immediately before the focusing operation period is raised. This obtains the same effect as taking a longer exposure time. On the other hand, if the imaging subject is bright, the pixel mixing number of the frame immediately before the focusing operation period is lowered since the exposure amount is sufficient. This enables displaying a finer image.

If the imaging subject is dark, the pixel mixing number in the focusing operation period is raised. This obtains the same effect as taking a longer exposure time. On the other hand, if the imaging subject is bright, the exposure amount is sufficient, and therefore the pixel mixing number in the focusing operation period is lowered. This enables displaying a finer image. Also, the pixel mixing number in the focusing operation period may be changed continuously if the brightness of the imaging subject changes in the focusing operation period.

[5-3-2. Read Frame Rate]

Since a brighter imaging subject is advantageous to the focusing operation as described above, a method of further shortening the focusing operation period may be obtained by, with use of the information pertaining to the brightness of the imaging subject detected by the exposure meter 112, a combination of lowering the read frame rate to lengthen the exposure time if the imaging subject is dark, and raising the read frame rate if the imaging subject is bright.

If the imaging subject is dark, the read frame rate of the frame immediately before the focusing operation period is lowered. This enables taking a longer exposure time. On the other hand, if the imaging subject is bright, the read frame rate immediately before the focusing operation period is raised since the exposure amount is sufficient. This enables further shortening the focusing operation period.

If the imaging subject is dark, the read frame rate in the focusing operation period is lowered. This enables taking a longer exposure time. On the other hand, if the imaging subject is bright, the read frame rate in the focusing operation period can be raised since the exposure amount is sufficient. This enables further shortening the focusing operation period.

If the brightness of the imaging subject is darker than a predetermined brightness, image signals of the CCD 102 may be read after a plurality of frame periods in the focusing operation period have elapsed. This enables obtaining the same effect as lowering the read frame rate.

[5-4. Display Frame Rate]

The display frame rate of the LCD 107 may be set to the same frame rate as the read frame rate of the CCD 102. In this case, images of the imaging subject can be continuously displayed more smoothly in the focusing operation period.

Also, the display frame rate of the LCD 107 may be set to the same display frame rate in both the normal operation period and the focusing operation period, even if the read frame rate of the CCD 102 changes. In this case, there is no change in the display frame rate even in the focusing operation period, thereby enabling avoiding a sense of unpleasantness due to a change in the display frame rate.

Embodiment 2

Figure 6:
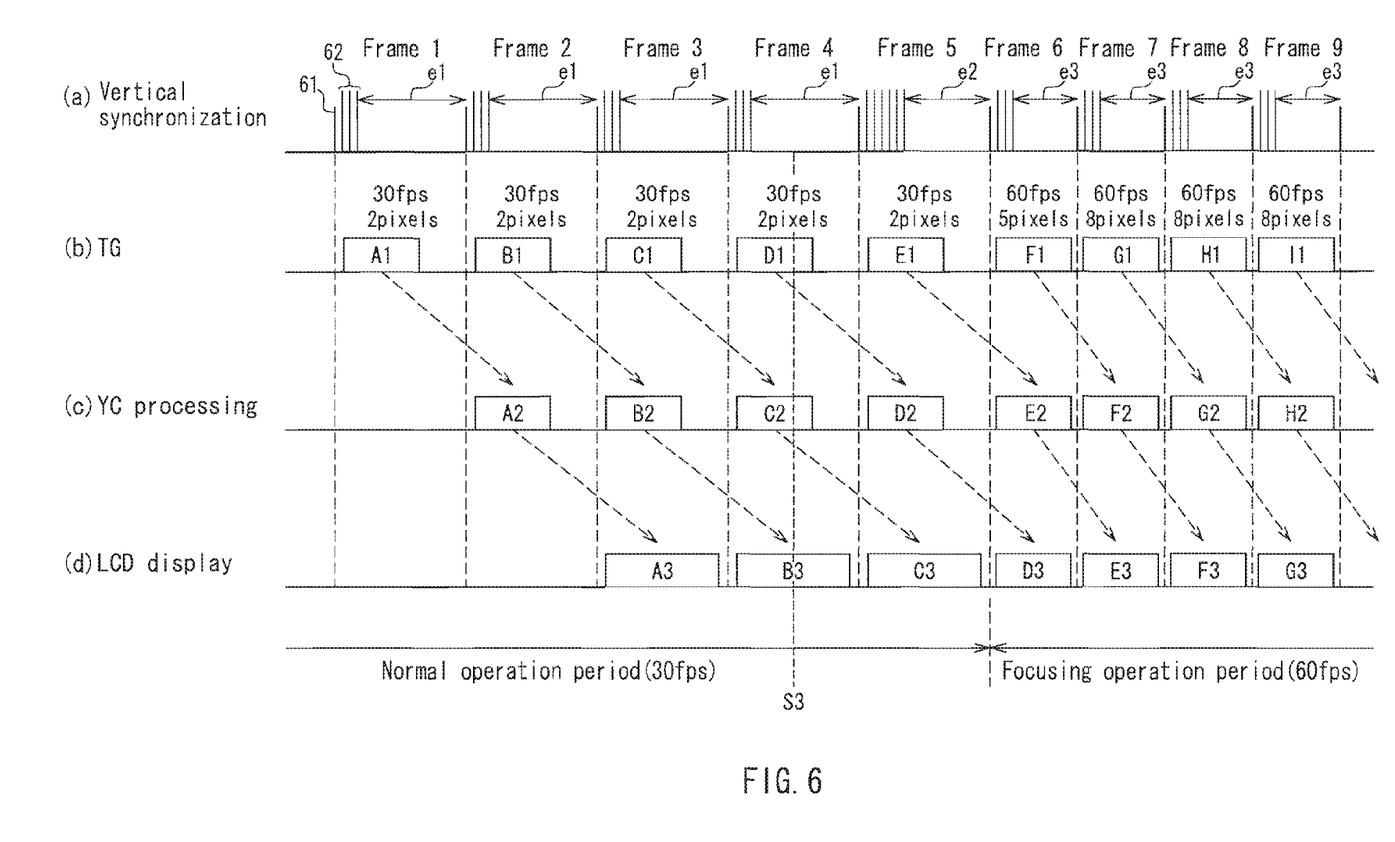
FIG. 6 is a timing chart for illustrating operations in Embodiment 2.

FIG. 6 is a timing chart for illustrating operations of an imaging device in Embodiment 2. Note that the operations shown in FIG. 6 are characteristic in that the time from when the shutter button 108 is pressed halfway until when the focusing operation period begins is one frame shorter than the operations shown in FIG. 4. Accordingly, the focusing operation can be started at an earlier timing after the shutter button 108 has been pressed halfway, compared to the operations shown in FIG. 4. Also, the operations shown in FIG. 6 are performed in the imaging device shown in FIG. 1. Also, although the pixel mixing number set in the pixel mixing control unit 104c is two pixels in the normal operation period and eight pixels in the focusing operation period in the present embodiment, these pixel mixing number settings are exemplary.

FIG. 6(a) is a vertical synchronization signal of the CCD 102. Also, in FIG. 6(a), a pulse 61 is a vertical synchronization pulse, and a pulse 62 is a sub-pulse. The sub-pulse 62 is a pulse that sweeps out any charge in the CCD 102, and the CCD 102 is exposed to light based on a predetermined exposure time between the last sub-pulse in a frame and the first sub-pulse of the next frame. Since the time between these sub-pulses used for light exposure is the exposure time in the frames, the exposure time can be adjusted according to the number of sub-pulses and generation period. Also, the exposure times of frames 1 to 4 are indicated as e1, the exposure time of frame 5 is indicated as e2, and the exposure time of frame 6 and onward is indicated as e3. FIG. 6(b) indicates an image signal read from the CCD 102 driven by the CCD driver IC 110, and A1, B1, . . . indicate one frame-worth of image signals (in the figure, TG is an abbreviation for Timing Generator). Also, FIG. 6(b) shows the read frame rate and pixel mixing number in each frame. FIG. 6(c) indicates image data to be YC processed in the signal processing unit 104b, and A2, B2, . . . indicate one frame-worth of image signals. FIG. 6(d) indicates periods in which images are displayed on the LCD 107, and the characters A3, B3, . . . noted in the image display periods indicate one frame-worth of display data to be displayed in the image display periods. Also, S3 indicates a timing at which the shutter button 108 is pressed halfway. The following describes these operations.

Firstly, in the normal operation period indicated in frames 1 to 3, the CCD 102 performs, under the drive control by the CCD driver IC 110, two-pixel mixing processing and reading of image signals based on the read frame rate of 30 fps as shown in FIG. 6(b). At this time, the CCD 102 is exposed to light based on the exposure time e1.

Note that read frame rate setting is performed in the vertical synchronization periods shown in FIG. 6(a), and the content of a setting becomes enabled in the next frame. For example, the read frame rate set in the vertical synchronization period of frame 1 becomes enabled with respect to the image signal B1 read from the CCD 102 in frame 2. The AFE 103 performs signal processing and digital conversion on the image signal read from the CCD 102, the resulting image signal is input to the signal processing unit 104b, and the signal processing unit 104b performs YC processing on the image data output from the AFE 103.

As shown in FIG. 6(c), the timing of the YC processing performed on the image data is furthermore one frame later than the timings of FIG. 6(b), for example, the YC processing performed on the image signal B1 read from the CCD 102 in frame 2 is performed in frame 3 as shown by image data B2.

Next, the signal processing unit 104b converts the image data resulting from the YC processing into display data that is displayable on the LCD 107. The timing of the processing for converting the image data to the display data is furthermore one frame later than the timings shown in FIG. 6(c), for example, the conversion processing performed on the image data B2 resulting from the YC processing in frame 3 is performed in frame 4, and display data B3 is generated. The LCD 107 displays images based on the display data in the periods shown in FIG. 6(d).

Next, if the shutter button 108 is pressed halfway at a timing S3 (frame 4), the CPU 104a obtains an ensurable brightness by performing a calculation based on the current exposure time and pixel mixing number, and in a case where a desired brightness is ensurable even if the read frame rate is changed to 60 fps, the CPU 104a sends an instruction to the CCD driver IC 110 to perform control so as to drive the CCD 102 at 60 fps (high-speed focusing mode). In a case that the desired brightness cannot be ensured if the read frame rate is changed to 60 fps, the read frame rate of the CCD 102 is kept at 30 fps (normal focusing mode).

In a case of changing the read frame rate of the CCD 102 to 60 fps, firstly, in the vertical synchronization period of frame 5, which is the frame after the frame at timing S3, the pixel mixing control unit 104c outputs an instruction to perform five-pixel mixing processing to the CCD driver IC 110. Note that an image signal E1 read from the CCD 102 in frame 5 is read from the CCD 102 based on the drive mode set in the vertical synchronization period of frame 4, and therefore two pixel mixing processing is performed.

Based on the five-pixel mixing processing instruction sent from the pixel mixing control unit 104c in the vertical synchronization period of frame 5, the CCD driver IC 110 performs control to cause the CCD 102 to perform five-pixel mixing processing in frame 6. Accordingly, an image signal F1 resulting from five-pixel mixing processing is obtained in frame 6 as shown in FIG. 6(b). At this time, the read frame rate of the CCD 102 is still 30 fps in frame 5, and the number of sub-pulses 62 is raised over the number of sub-pulses 62 in frames 1 to 4 to cause the exposure time e2 in frame 5 to be shorter than the exposure time e1 in frames 1 to 4. This is performed in order to prevent the image from becoming too bright due to increasing the pixel mixing number from two pixels to five pixels. This eliminates a large change in image brightness at a timing when the image displayed on the LCD 107 switches from an image based on display data E3 to an image based on display data F3, thereby enabling continuously displaying images smoothly. Note that since the length of the exposure time e2 can be adjusted by increasing or decreasing the number of sub-pulses 62, the brightness of the image obtained by light exposure in frame 5 can be adjusted to an arbitrary brightness.

Also, in frame 6, the pixel mixing control unit 104c causes the CCD driver IC 110 to change the read frame rate of the CCD 102 from 30 fps to 60 fps. Also, in the vertical synchronization period of frame 6, the pixel mixing control unit 104 outputs, to the CCD driver IC 110, an instruction to change the pixel mixing number from five pixels to eight pixels.

Next, in frame 7, based on the eight pixel mixing processing instruction sent from the pixel mixing control unit 104c in the vertical synchronization period of frame 6, the CCD driver IC 110 performs control to cause the CCD 102 to perform eight-pixel mixing processing and also output an image signal obtained by light exposure in the exposure time e3. Here, in frame 7, since the read frame rate of the CCD 102 was changed to 60 fps and the high-speed focusing operation is being performed, the exposure time e3 in frame 7 is shorter than the exposure time e2 due to being based on the read frame rate of 60 fps. Compensation for an insufficient amount of light from the imaging subject due to the exposure time becoming shorter is performed by raising the pixel mixing number from five pixels to eight pixels. This eliminates a large change in image brightness at a timing when the image displayed on the LCD 107 switches from an image based on display data F3 to an image based on display data G3, thereby enabling continuous of display images smoothly.

From frame 8 until the focusing operation period has been completed, the pixel mixing control unit 104c performs eight-pixel mixing processing similarly to frame 7 and sets the read frame rate of the CCD 102 to 60 fps.

As described above, in the present embodiment, the pixel mixing number when reading image signals of the CCD 102 in the focusing operation period is higher than the pixel mixing number in the normal operation period, thereby obtaining the same effect as lengthening the exposure time even in the focusing operation period in which the read frame rate is raised to 60 fps. This has the superior effect of enabling performing a high-speed focusing operation even if an imaging subject is dark.

Also, the pixel mixing number is switched in stages from two pixels, then to five pixels, and then to eight pixels, which eliminates an extreme change in the pixel mixing number at a time of switching from the normal operation period to the focusing operation period, thereby enabling continuously displaying images of the imaging subject more smoothly.

Also, causing the exposure time e2 at a time of performing five-pixel mixing to be shorter than the exposure time e1 at a time of performing two-pixel mixing processing and be longer than the exposure time e3 at a time of performing eight-pixel mixing processing eliminates a large change in the brightness of the image displayed on the LCD 107 at a time of switching from the normal operation period to the focusing operation period, thereby enabling continuous display of images more smoothly.

Note that the pixel mixing number set by pixel mixing control unit 104c is exemplary.

Also, in Embodiments 1 and 2, when the shutter button 108 is pressed halfway, the processing moves to the so-called high-speed focusing mode in which the read frame rate is raised and the pixel mixing number is increased, and the operating continues in high-speed focusing mode until the shutter button 108 is released from the halfway pressed condition or until the shutter button 108 is fully pressed. However, the present invention may be structured so as to move to the normal focusing mode (a mode in which the read frame rate is set to 30 fps and the pixel mixing number is set to two pixels) while in the high-speed focusing mode. In moving from the high-speed focusing mode to the normal focusing mode, for example, the exposure time of the CCD 102 while in the high-speed focusing mode may be monitored, and the processing may be moved to the normal focusing mode if the imaging subject becomes dark and the exposure time becomes longer than a predetermined value.

Also, although the exposure meter 112 is an example of a luminance detection unit in Embodiments 1 and 2, the exposure meter 112 does not necessarily need to be provided. For example, the brightness of the imaging subject can be measured based on the luminance of an image based on an image signal output from the CCD 102.

INDUSTRIAL APPLICABILITY

According to the present invention, a high-speed focusing operation can be performed even if an imaging subject is dark. The present invention is therefore applicable to imaging devices such as digital cameras, digital video cameras, and mobile phone terminals having cameras, in which a focusing operation is performed while viewing a display means.

The invention claimed is:

1. An imaging device comprising:
a control unit that sets a read frame rate and a pixel mixing number; and
an imaging element that generates an image signal at the set read frame rate, mixes image signals of a plurality of pixels in accordance with the set pixel mixing number, and outputs an image signal obtained by the mixing,
wherein in a case of changing the read frame rate and the pixel mixing number, the control unit changes the pixel mixing number and causes completion of reading an image signal from the imaging element in accordance with the pixel mixing number obtained by the changing, and thereafter varies, between the read frame rate and the pixel mixing number, at least the read frame rate.

2. The imaging device of claim 1,
wherein the imaging device performs a normal operation in a normal operation period and performs an automatic focusing operation in a focusing operation period, and
the control unit changes the read frame rate so that the read frame rate in the focusing operation period is different from the read frame rate in the normal operation period.

3. The imaging device of claim 2,
wherein in a case of moving from the normal operation to the automatic focusing operation, the control unit raises the pixel mixing number and causes the imaging element to output an image signal in accordance with the pixel mixing number obtained by the changing, and thereafter changes the read frame rate so that the read frame rate in the focusing operation period is higher than the read frame rate in the normal operation period.

4. The imaging device of claim 3,
wherein in a frame immediately before moving to the automatic focusing operation, the control unit raises the pixel mixing number and causes the imaging element or the signal processing unit to output an image signal in accordance with the pixel mixing number obtained by the changing, and thereafter changes, between the read frame rate and the pixel mixing number, at least the read frame rate.

5. The imaging device of claim 3,
wherein among a plurality of frames before moving to the automatic focusing operation, in at least a frame immediately before the automatic focusing operation, the control unit changes the read frame rate so as to be higher than the read frame rate in the normal operation period and lower than the read frame rate in the focusing operation period.

6. The imaging device of claim 2,
wherein in a case of moving from the automatic focusing operation to the normal operation, the control unit lowers the pixel mixing number and causes the imaging element to output an image signal at the pixel mixing number obtained by the changing, and thereafter changes the read frame rate so that the read frame in the normal operation period is lower than the read frame rate in the focusing operation period.

7. The imaging device of claim 6,
wherein in a frame immediately before moving to the normal operation, the control unit lowers the pixel mixing number and causes the imaging element to output an image signal in accordance with the pixel mixing number obtained by the changing, and thereafter changes, between the read frame rate and the pixel mixing number, at least the read frame rate.

8. The imaging device of claim 6,
wherein among a plurality of frames before moving to the normal operation, in at least a frame immediately before the normal operation, the control unit changes the read frame rate so as to be lower than the read frame rate in the focusing operation period and higher than the read frame rate in the normal operation period.

9. The imaging device of claim 1, further comprising:
a display data processing unit that, based on output from the imaging element, generates display data expressing an image for display; and
a display unit that displays the image based on the display data at a display frame rate that is the same frame rate as a read frame rate of the imaging element.

10. The imaging device of claim 2, further comprising:
a display data processing unit that, based on output from the imaging element, generates display data expressing an image for display; and
a display unit that displays the image based on the display data at a display frame rate that, even in the focusing operation period, is the same frame rate as a read frame rate of the imaging element in the normal operation period.

11. The imaging device of claim 2, further comprising:
a luminance detection unit that detects a brightness of an imaging subject,
wherein the control unit changes the read frame rate in the focusing operation period according to the brightness of the imaging subject detected by the luminance detection unit.

12. The imaging device of claim 11,
wherein the control unit changes a frame rate of a frame immediately before the focusing operation period according to the brightness of the imaging subject detected by the luminance detection unit.

13. The imaging device of claim 1,
wherein the imaging device performs a normal operation in a normal operation period and performs an automatic focusing operation in a focusing operation period, and
the control unit performs control so that in the focusing operation period, the image signal is read from the imaging element in accordance with a larger pixel mixing number than in the normal operation period.

14. The imaging device of claim 2,
wherein if the pixel mixing number in the normal operation period is greater than or equal to a predetermined value, the control unit performs control so that in the focusing operation period, the image signal is read from the imaging element based on the read frame rate in the normal operation period.

* * * * *